United States Patent [19]

Kuchler

[11] Patent Number: 4,867,257
[45] Date of Patent: Sep. 19, 1989

[54] SLICING MACHINE WITH PRODUCT IDENTIFIER

[76] Inventor: Fritz Kuchler, Klatteweg 4, A-9010 Klagenfurt, Fed. Rep. of Germany

[21] Appl. No.: 284,977

[22] Filed: Dec. 15, 1988

[51] Int. Cl.⁴ .................. G01G 23/22; G01G 19/52; B26D 7/00
[52] U.S. Cl. ............................ 177/25.15; 177/50; 83/77
[58] Field of Search ............... 177/25.15, 50; 83/77

[56] References Cited

U.S. PATENT DOCUMENTS

| | | | |
|---|---|---|---|
| 3,528,089 | 9/1970 | Martin | 177/25.15 X |
| 3,825,085 | 7/1974 | Martin | 177/25.15 X |
| 4,763,738 | 8/1988 | Kuchler | 177/50 |
| 4,794,996 | 1/1989 | Wallace et al. | 177/50 X |

Primary Examiner—George H. Miller, Jr.

[57] ABSTRACT

The slicing machine, primarily for sliced meats, has a code reader, particularly a bar code reader, available in the vicinity of its goods slicing carriage which reliably determines the goods code for the sliced goods during the slicing process and fetches a programmed price per unit weight from a data memory of a weighing device. The price per unit weight is fed to a processor which determines the price of the goods being weighed or the retail price from the weight measurement. The delivery tray of the slicing machine can be a weighing tray of a weighing device built into the slicing machine. An indicator and/or a charge slip printer can then automatically print the total price that must be paid.

3 Claims, 1 Drawing Sheet

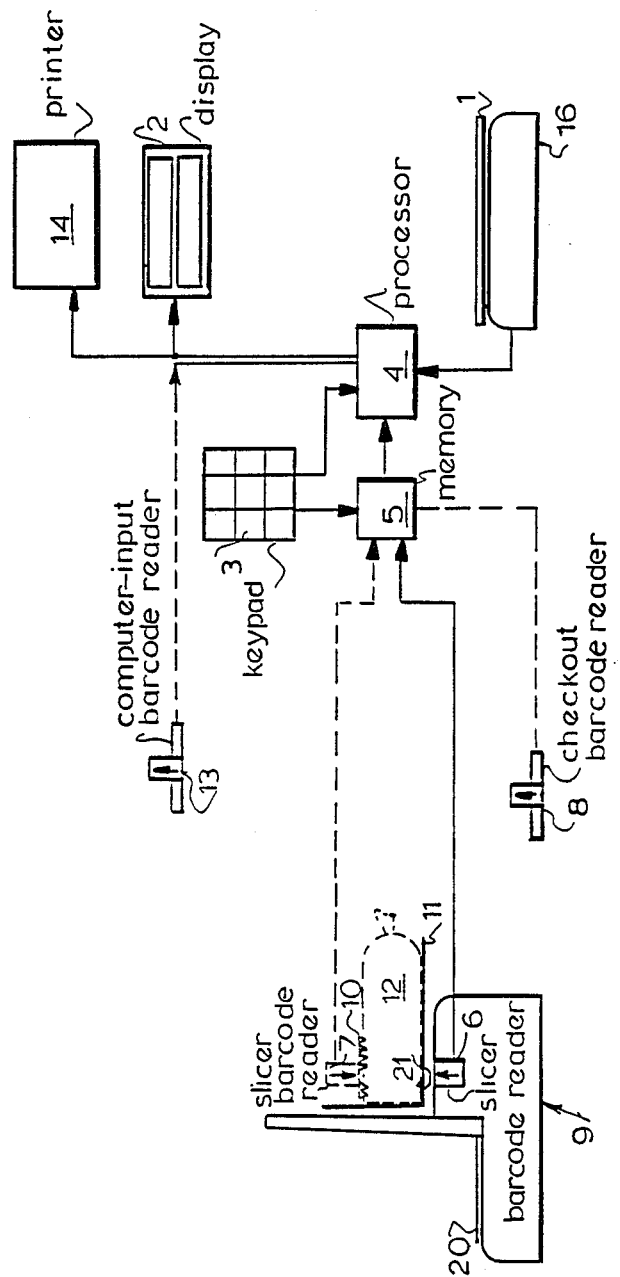

SLICING MACHINE WITH PRODUCT IDENTIFIER

CROSS REFERENCE TO RELATED PATENTS

This application is related to the following issued U.S. Pat. Nos. 4,185,527, filed Jan. 29, 1980; 4,217,650 filed Aug. 12, 1980; D, 263,594 filed Mar. 30, 1982; 4,379,416 filed Apr.12, 1983; 4,586,409 filed May 6, 1986; 4,598,618 filed July 8, 1986; 4,338,836 filed July 3, 1982 and 4,763,738 filed Aug. 16,1988.

FIELD OF THE INVENTION

My present invention relates to a slicing machine especially to a slicing machine for the slicing of wursts and other meat products.

BACKGROUND OF THE INVENTION

For goods which are to be positioned by a slicing machine and after slicing are deposited in the form of a plurality of decorative slices, the price per unit weight must be keyed in or fed to a scale to determine the weight-proportional retail price.

The process must be repeated about twenty times per commercial length of wurst or sausage to fully market the product which is purchased in portions.

The piece price or price per unit weight can be taken and/or directly determined from a label present on the goods by a bar code reader. However the goods must be manually moved once or twice past a bar code reader.

A computer scale is described in U.S. Patent 3 962 569 which has a reader available for inputting of price information. The inputting of this information is effected by a card which is sensed photoelectrically. The operation of this system is problematical and gives rise to errors because on the one hand the goods and on the other hand the correct card must be selected and the goods must be placed on the scale or weighing device and the card must be pushed into the reader. Placing the bar code on the goods is better because confusion between the goods and the price per unit weight is then avoided. It is however necessary in practice when the code is applied directly on the goods to move the goods past the reader many times so that prior to and independently of the cutting operation an accurate reading may reliably be effected.

OBJECT OF THE INVENTION

It is an object of my invention to provide an improved slicing machine for simplifying the process of slicing of the goods and determining the price.

SUMMARY OF THE INVENTION

This object and others which will become more readily apparent hereinafter are attained in accordance with my invention in a slicing machine comprising a goods slicing carriage and a delivery tray which is also a weighing tray of a weighing device.

According to my invention a code reader, especially a bar code reader, is provided in the vicinity of the goods slicing carriage for detection of a corresponding code on the sliced goods during the slicing process and a memory for the price per unit weight, especially the price per pound or per kilogram a processor connected with the weighing device for determination of data such as retail price, total price of a group of retail items or the like and an indicator and/or a charge slip printer for the price per unit weight and the total price are connected to the code reader.

The goods to be sliced carries directly or indirectly price data which is no longer keyed in or fed manually but is read by a reader, especially a bar code reader, during the slicing process. On the basis of the price per unit weight thus read or retrieved from the memory the weighing device determines the retail price or the portion price in a known way. The motion of the sliced goods carriage required for the slicing process is used in a particularly advantageous way simultaneously for reading the code. By the repeated reversing motion of the goods slicing carriage a reliable reading of the goods code is guaranteed. The sliced meat or goods slicing machine can be connected with a computer scale by a cable for transmission of the detected codes or can be made available to a weighing system in which the slicing machine with the computer scale forms a part. A machine with the above-described structure fulfills all these requirements.

BRIEF DESCRIPTION OF THE DRAWINGS

The above and other objects, features and advantages of my invention will become more readily apparent from the following description, reference being made to the accompanying highly diagrammatic drawing in which the sole figure is a block diagram of a sliced-goods slicing machine according to my invention.

SPECIFIC DESCRIPTION

The sliced-goods slicing machine according to my invention is shown in the drawing uses a weighing tray 1 with weight measuring components of an electronic scale 16 in an accompanying housing, an indicator or display 2 and/or a charge slip printer 14 for the weight determined, a plurality of keys 3 (in a conventional keypad) for the inputting of the price per unit weight or kiloprice per unit weight of the sliced goods and a processor 4.

This computer scale acts to determine the retail price of the portion being weighed from the kiloprice per unit weight and the weight result and acts to determine an intermediate sum and/or a final sum. A memory 5 from which data (the kiloprice per unit weight) set by the keys 3 and also by a code (bar code) read by a code reader 6, 7, 8 are retrievable is connected to the processor 4.

The kiloprice per unit weight programmed according to the code (goods code) then is fed to the processor 4 without the heretofore necessary individual manual data fed for determining the retail price which appears on the indicator 2 and/or on the charge slip together with the retail weight as an additional result.

The optical code reader 6 is built into the slicing machine 9 according to my invention. With the slicing motion provided by the goods slicing carriage 11, which moves past a blade (not shown) to deposit the slices on the slicer table 20, the goods 12 to be sliced moves past the code reader 6 located under the goods slicing carriage 11 (through a window 21 therein) many times and reliably transmits a code (longitudinal bars or strips) provided on the surface of the goods.

The goods are thus identified and the automatic correlation of the goods with the kiloprice per unit weight and if necessary other data is successful and correct. Furthermore it is possible to provide an auxiliary code reader unit 7 on a goods holder 10 and additionally also to provide a code reader 8 outside the sliced-goods slicing machine and the weighing device 16, e.g. for checkout or at a service counter.

When the price of a portion of goods or the goods is fixed independent of the weight, then the code for these goods eventually after reading the price of the goods from the memory 5 is directly fed to the indicator viewer of the indicator 2 bypassing the weighing device 1. The piece price may be added together in a final sum in the processor 4. In the drawing further a code reader 13 (for the programming the computer 4) is illustrated symbolically and is directly connected to the computer 4 and the indicator 2 in a known way.

The weighing tray 1 can also advantageously be the delivery tray which receives the sliced goods directly from the goods slicing carriage 11 and the weighing device 16 is advantageously part of the goods slicing machine 9.

I claim:

1. In a sliced-goods slicing machine for sliced goods, especially for sliced meats, comprising a goods slicing carriage and a delivery tray formed as a weighing tray of a weighing device, the improvement wherein a code reader is provided in the vicinity of said goods slicing carriage for detection of a code on said sliced goods during the slicing process and a memory for among other things a price per unit weight and a processor connected with said weighing device for determination of data such as retail price, total price of a group of portions of said sliced goods or the like and an indicator and/or a charge slip printer are connected to said code reader.

2. The improvement defined in claim 1 wherein said code reader is a bar code reader.

3. A sliced-goods slicing machine for sliced goods, primarily for sliced meats, comprising:
  a goods slicing carriage on which said sliced goods are generated;
  a weighing device with a weighing tray which receives said sliced goods;
  a bar code reader for reading a bar code in the vicinity of said sliced goods during the slicing process;
  a memory in which a price per unit weight of said sliced goods is stored, said memory being connected to said bar code reader for input said price per unit weight;
  a processor connected to said weighing device, said memory and said bar code reader for computation of a retail price and/or a total price of a group of portions of said sliced goods; and
  an indicator and/or a charge slip printer for said retail price and/or said price per unit weight and/or said total price of a group of portions of said sliced goods.

* * * * *